United States Patent
Bajko et al.

(10) Patent No.: US 8,087,069 B2
(45) Date of Patent: Dec. 27, 2011

(54) METHOD, APPARATUS AND COMPUTER PROGRAM PRODUCT PROVIDING BOOTSTRAPPING MECHANISM SELECTION IN GENERIC BOOTSTRAPPING ARCHITECTURE (GBA)

(75) Inventors: Gabor Bajko, San Diego, CA (US); Tat Keung Chan, San Diego, CA (US)

(73) Assignee: Nokia Corporation, Espoo (FI)

( * ) Notice: Subject to any disclaimer, the term of this patent is extended or adjusted under 35 U.S.C. 154(b) by 1693 days.

(21) Appl. No.: 11/232,494

(22) Filed: Sep. 21, 2005

(65) Prior Publication Data
US 2006/0282882 A1 Dec. 14, 2006

Related U.S. Application Data

(60) Provisional application No. 60/690,528, filed on Jun. 13, 2005, provisional application No. 60/692,855, filed on Jun. 21, 2005.

(51) Int. Cl.
*G06F 7/04* (2006.01)
(52) U.S. Cl. ............................ 726/4; 713/2
(58) Field of Classification Search ............ 726/2–4
See application file for complete search history.

(56) References Cited

U.S. PATENT DOCUMENTS

| | | | |
|---|---|---|---|
| 2002/0026581 A1 | 2/2002 | Matsuyama et al. | 713/168 |
| 2002/0157007 A1* | 10/2002 | Sashihara | 713/183 |
| 2003/0028763 A1* | 2/2003 | Malinen et al. | 713/155 |
| 2003/0115142 A1* | 6/2003 | Brickell et al. | 705/51 |

(Continued)

FOREIGN PATENT DOCUMENTS
EP 1343342 A1 9/2003
(Continued)

OTHER PUBLICATIONS

"3rd Generation Partnership Project; Technical Specification Group Services and System Aspects; Generic Authentication Architecture (GAA); Generic Bootstrapping architecture (Release 6)", 3GPP TS 33.220 V6.3.0, (Dec. 2004), pp. 1-38.

(Continued)

*Primary Examiner* — Kim Vu
*Assistant Examiner* — John B King
(74) *Attorney, Agent, or Firm* — Harrington & Smith

(57) ABSTRACT

In one exemplary and non-limiting aspect thereof this invention provides a method to execute a bootstrapping procedure between a node, such as a MN, and a wireless network (WN). The method includes sending the WN a first message that contains a list of authentication mechanisms supported by the MN; determining in the WN an authentication mechanism to be used for bootstrapping, based at least on the list received from the MN, and including in a first response message to the MN information pertaining to the determined authentication mechanism; and sending a second message to the WN that is at least partially integrity, the second message containing the list of authentication mechanisms that the MN supports in an integrity protected form. If authentication is successful, and if the list received in the second message matches the list received in the first message, the method further includes responding to the MN with a second response message that is at least partially integrity protected, where the second response message contains an indication of the selected authentication mechanism in an integrity protected form; and receiving the successful response message and verifying that the authentication mechanism used by the MN matches the authentication mechanism selected by the WN.

45 Claims, 9 Drawing Sheets

U.S. PATENT DOCUMENTS

| | | | |
|---|---|---|---|
| 2003/0166398 A1* | 9/2003 | Netanel | 455/410 |
| 2004/0028031 A1* | 2/2004 | Valin et al. | 370/352 |
| 2004/0198223 A1* | 10/2004 | Loh et al. | 455/41.1 |
| 2005/0009520 A1 | 1/2005 | Herrero et al. | 455/435.1 |
| 2005/0021957 A1 | 1/2005 | Gu | 713/170 |
| 2005/0094593 A1 | 5/2005 | Buckley | 370/328 |

FOREIGN PATENT DOCUMENTS

| | | |
|---|---|---|
| JP | 06-261033 | 9/1994 |
| JP | 10-242957 | 9/1998 |
| JP | 2003-157234 | 5/2003 |
| JP | 2004-021686 | 1/2004 |
| JP | 2004-040555 | 2/2004 |
| JP | 2004297759 A | 10/2004 |
| JP | 2005004769 A | 1/2005 |
| JP | 2005086656 A | 3/2005 |
| TW | 200307439 A | 1/2003 |
| TW | 200403000 A | 2/2004 |
| WO | WO-2004/112349 A1 | 12/2004 |
| WO | WO-2004/112349 A1 | 12/2005 |

OTHER PUBLICATIONS

Niemi, A. et al., "Hypertext Transfer Protocol (HTTP) Digest Authentication Using Authentication and Key Agreement (AKA)", RFC 3310, Sep. 2002, pp. 1-14.

Franks, J. et al., "HTTP Authentication: Basic and Digest Access Authentication", Jun. 1999, pp. 1-32.

"Wireless Local Area Network (WLAN) Interworking", 3rd Generation Partnership Project 2 "3GPP2", TSG-X (PSN), X.P0028-0, 45 pages.

"3rd Generation Partnership Project; Technical Specification Group Services and System Aspects; Generic Authentication Architecture (GAA); Generic Bootstrapping Architecture (Release 7)", 3GPP TS 33.220 V7.2.0, (Dec. 2005), pp. 1-68.

"3rd Generation Partnership Project 2; Generic Bootstrapping Architecture (GBA) Framework", 3GPP2 S.P0109-0 Version 0.6, Dec. 8, 2005, p. 1-57.

"WPA™ Deployment Guidelines for Public Access Wi-Fi® Networks", Wi-Fi Alliance, Oct. 28, 2004, 3 pgs.

"HTTP Authentication, RFC 2617", Frank et al., Standards Track, Jun. 1999, pp. 4, 5, 7, 8, 9, 14, 15, 16.

"3rd Generation Partnership Project; Technical Specification Group Services and System Aspects; Generic Authentication Architecture (GAA); Generic bootstrapping architecture (Release 6)", 3GPP TS 33.220 V6.3.0, Dec. 2004, pp. 11, 18 and 19.

* cited by examiner

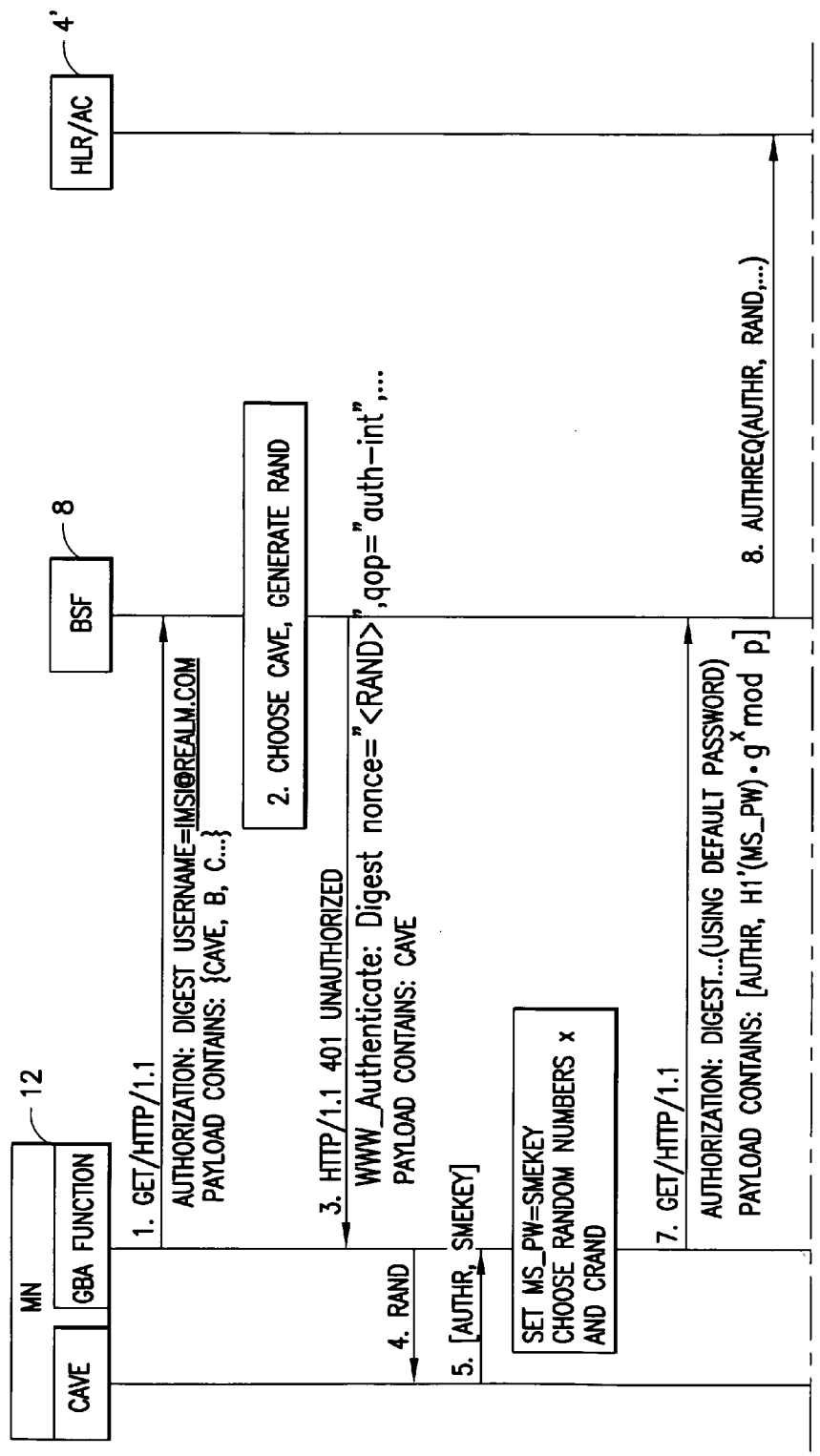

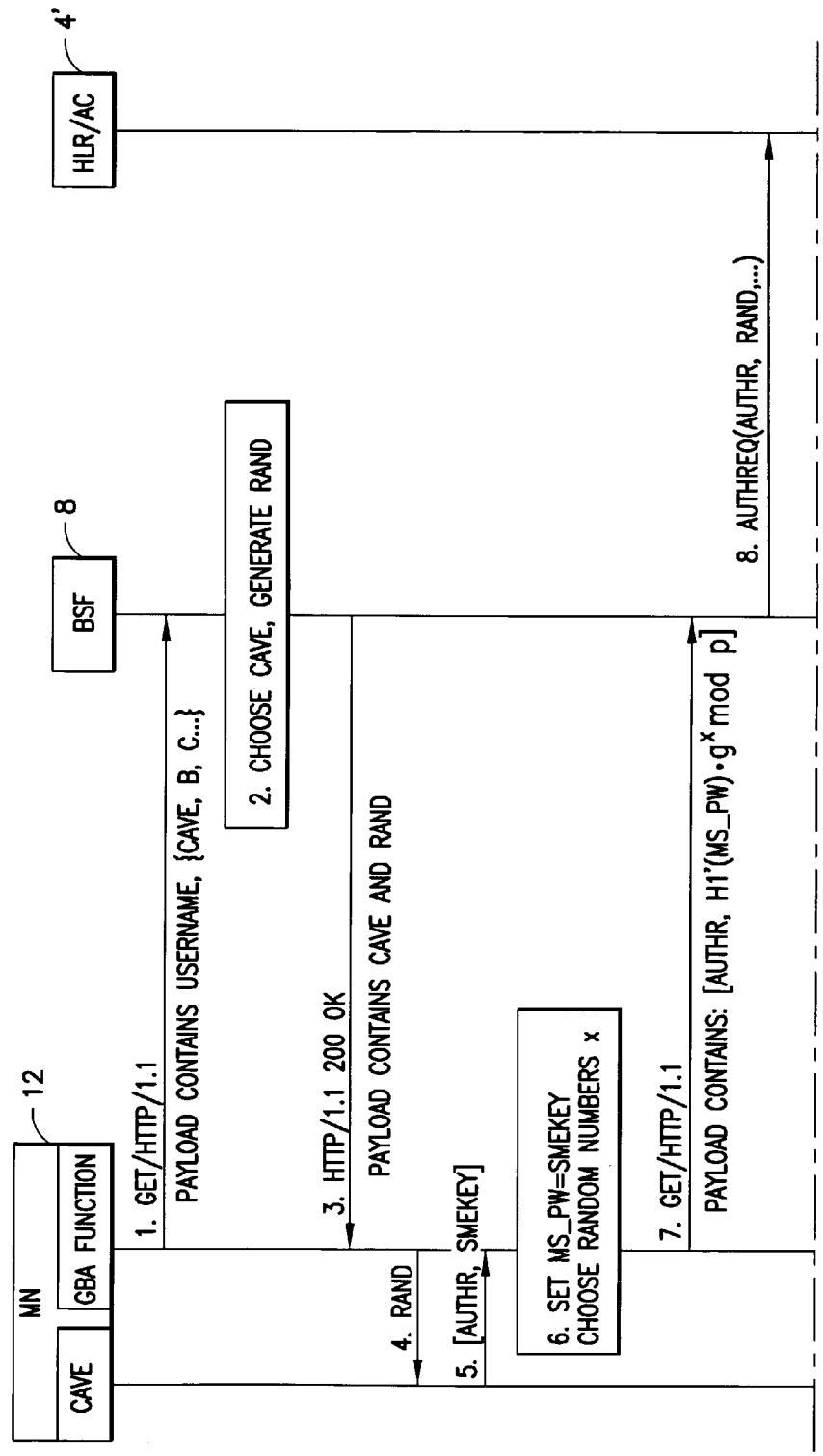

METHOD, APPARATUS AND COMPUTER PROGRAM PRODUCT PROVIDING BOOTSTRAPPING MECHANISM SELECTION IN GENERIC BOOTSTRAPPING ARCHITECTURE (GBA)

CLAIM OF PRIORITY FROM COPENDING PROVISIONAL PATENT APPLICATIONS

This patent application claims priority under 35 U.S.C. §119(e) from U.S. Provisional Patent Application No. 60/690,528, filed Jun. 13, 2005, the disclosure of which is incorporated by reference herein in its entirety, and from U.S. Provisional Patent Application No. 60/692,855, filed Jun. 21, 2005, the disclosure of which is incorporated by reference herein in its entirety, including the Exhibits A, B, C and D that are appended thereto.

TECHNICAL FIELD

The exemplary and non-limiting embodiments of this invention relate generally to communication systems, methods and devices and, more specifically, relate to authentication and related techniques used in communication systems.

BACKGROUND

The following definitions are herewith defined:
3GPP Third Generation Partnership Project
GAA Generic Authentication Architecture
GBA Generic Bootstrapping Architecture
BSF Bootstrapping Server Function
AKA Authentication and Key Agreement
MN Mobile Node
MITM Man in the Middle
B-TID Bootstrapping Transaction Identifier
UE User Equipment
EV-DO Evolution Data Only
HLR Home Location Register
AC Authentication Center
RUIM Removable User Identity Module
WLAN Wireless Local Area Network
WKEY WLAN Long Term Key 3GPP GBA (see 3GPP TS 33.220 "GAA:GBA", attached as Exhibit A to U.S. Provisional Patent Application No. 60/692,855, filed Jun. 21, 2005) aims at specifying a mechanism to bootstrap authentication and key agreement for application security from the 3GPP AKA mechanism. GBA is also being introduced in 3GPP2, where apart from AKA, bootstrapping based on legacy key materials, including the SMEKEY (for CDMA1x systems) and MN-AAA Key (for CDMA1x EV-DO systems), are also being standardized. As a result, when operating in a 3GPP2 system a MN may support, or may be required to support, more than one authentication and bootstrapping mechanism. A technique is therefore needed for the MN and the network to agree on the algorithm set to be used in the bootstrapping. The same is required for future terminals that support both 3GPP and 3GPP2 networks, such that a 3GPP terminal may roam in a 3GPP2 network (and vice versa) and still use GBA. In addition, it is possible for operators to deploy both 3GPP and 3GPP2 networks in the same geographical location. In such cases, terminals also have to negotiate with the network the bootstrapping mechanism to use.

3GPP supports only one authentication and bootstrapping mechanism, i.e., the Digest-AKA mechanism and AKA protocol with 3GPP-defined algorithms. Usage of AKA with Digest authentication is specified in Digest-AKA (see IETF RFC 3310 "Digest AKA", attached as Exhibit B to U.S. Provisional Patent Application No. 60/692,855, filed Jun. 21, 2005).

In 3GPP2 there are different mechanisms for bootstrapping supported in the network side, as both legacy and non-legacy terminals need to be supported. Currently, however, there is no procedure specified to communicate the supported mechanism(s)/protocols from the MN to the network. There is also no procedure standardized to select a correct bootstrapping mechanism.

SUMMARY

In one exemplary and non-limiting aspect thereof this invention provides a method that includes sending a wireless network (VWN) a first message that is comprised of a list of authentication mechanisms supported by a node; determining in the WN an authentication mechanism to be used for bootstrapping, based at least on the list received from the node, and including in a first response message to the node information pertaining to the determined authentication mechanism; sending a second message to the WN that is at least partially integrity protected based on the determined authentication mechanism, the second message comprising the list of authentication mechanisms that the node supports in an integrity protected form; if authentication is successful, and if the list received in the second message matches the list received in the first message, responding to the node with a second response message that is at least partially integrity protected, where the second response message may contain an indication of the selected authentication mechanism in an integrity protected form.

In another exemplary and non-limiting aspect thereof this invention provides a computer program product embodied in a computer readable medium the execution of which by a data processor of a node comprises operations of sending a wireless network (WN) a first message that is comprised of a list of authentication mechanisms supported by the node; receiving a first response message from the WN, the first response message comprising information pertaining to an authentication mechanism selected by the WN from the list provided by the node in the first message; and sending a second message to the WN that is at least partially integrity protected, the second message comprising the list of authentication mechanisms that the node supports in an integrity protected form.

In another exemplary and non-limiting aspect thereof this invention provides a device comprising a data processor coupled to a transmitter and to a receiver and operable to send to a network via the transmitter a first message that is comprised of a list of authentication mechanisms supported by the device and to receive from the network via the receiver a first response message. The first response message includes information pertaining to an authentication mechanism selected by the network from the list. The data processor is operable to integrity protect the list of authentication mechanisms supported by the device and to send via the transmitter a second message to the network that is at least partially integrity protected, where the second message includes the list of authentication mechanisms that the device supports in an integrity protected form.

In another exemplary and non-limiting aspect thereof this invention provides a computer program product embodied in a computer readable medium the execution of which by a data processor of a wireless network element (WNE) comprises operations of receiving from a node a first message that is comprised of a list of authentication mechanisms supported by the node; determining an authentication mechanism to be used for bootstrapping, based at least on the list received from the node; sending a first response message to the node, the first response message comprising information pertaining to the determined authentication mechanism; and a second message from the node that is at least partially integrity protected, the second message comprising the list of authentication mechanisms that the node supports in an integrity protected form In another exemplary and non-limiting aspect thereof this invention provides a network device having a data processor coupled to a transmitter and to a receiver and operable to receive from a node, via the receiver, a first message that is comprised of a list of authentication mechanisms supported by the node. The data processor is further operable to determine an authentication mechanism to be used for bootstrapping, based at least in part on the list received from the node, and to send a first response message to the node via the transmitter. The first response message includes information pertaining to the determined authentication mechanism. The data processor is further operable to receive from the node a second message that is at least partially integrity protected, where the second message includes the list of authentication mechanisms that the node supports in an integrity protected form.

In another exemplary and non-limiting aspect thereof this invention provides a system that includes a device coupled to a network device, where the device includes a data processor coupled to a transmitter and to a receiver and that is operable to send to the network device via the transmitter a first message that is comprised of a list of authentication mechanisms supported by the device. The network device also comprises a data processor coupled to a transmitter and to a receiver and that is operable to select an authentication mechanism from the list. The device receives from the network device via the receiver a first response message, the first response message comprising information pertaining to the authentication mechanism selected by the network device from the list. The device data processor is operable to integrity protect the list of authentication mechanisms supported by the device and to send via the transmitter a second message to the network device that is at least partially integrity protected, the second message comprising the list of authentication mechanisms that the device supports in an integrity protected form.

DETAILED DESCRIPTION

Figure 1:
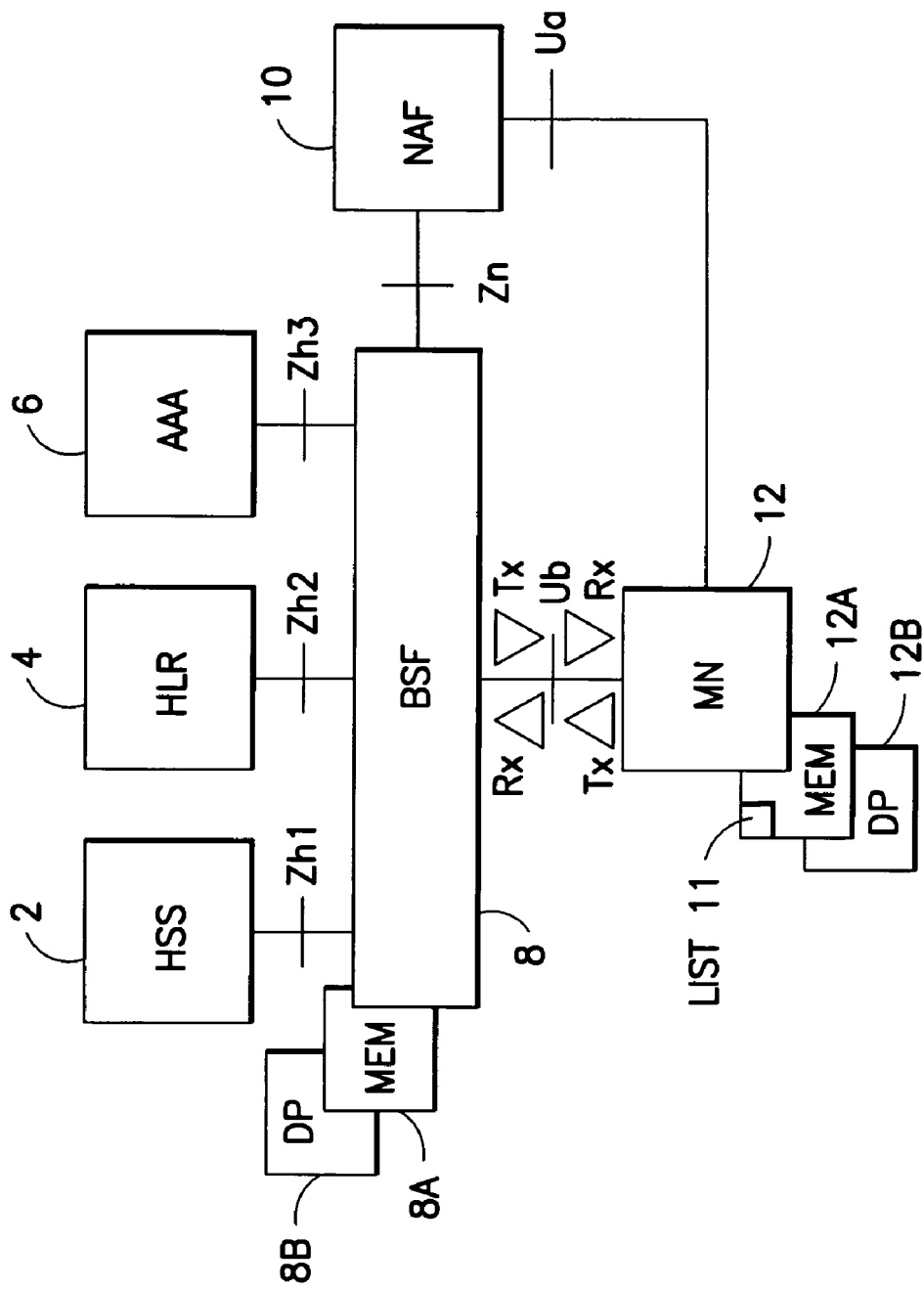
FIG. 1 is a block diagram that illustrates the 3GPP2 GBA reference network architecture.

The non-limiting and exemplary embodiments of this invention deal with the 3GPP Generic Bootstrapping Architecture (GBA), which has been defined in 3GPP and has also been introduced in 3GPP2. FIG. 1 shows the general and non-limiting bootstrapping reference architecture. In FIG. 1 there is shown a Home Subscriber System (HSS) 2, a Home Location Register (HLR) 4, an Access, Authentication and Accounting (AAA) server 6, the BSF 8, a Network Application Function (NAF) 10 and the User Equipment/Mobile Node (MN) 12, as well as the interfaces between these components. It is assumed that suitable transmitters (Tx) and receivers (Rx) are used to covey information and messages between the MN 12 BSF 8 and other network components. The non-limiting and exemplary embodiments of invention deal primarily with the procedures related to the Ub interface between the MN 12 and the BSF 8 where bootstrapping is performed. Note that a mobile terminal is referred to as User Equipment (UE) in 3GPP, and as a Mobile Node (MN) in 3GPP2. In this patent application these terms may be used interchangeably without a loss of generality, and they may also be referred to even more generally as a device or as a node.

The non-limiting and exemplary embodiments of this invention aim at providing a mechanism to negotiate the supported mechanisms/algorithms for bootstrapping between the MN 12 and the network.

The non-limiting and exemplary embodiments of this invention provide a solution for the MN 12 and the network element (BSF 8) to agree on an authentication and bootstrapping mechanism for use in GBA (3GPP2 environment). It also defines how the mechanism can be integrated into the existing 3GPP procedures. It is assumed that the MN 12 possesses a list 11 of the authentication and bootstrapping mechanisms that it supports, such as by storing the list 11 in a memory (MEM) 12A coupled to a data processor (DP) 12B. The memory 12A is also assumed to include program code for operating the DP 12B in accordance with the various embodiments of this invention. It is further assumed that the BSF 8 also includes a memory (MEM) 8A coupled to a data processor (DP) 8B. The memory 8A is assumed to include program code for operating the DP 8B in accordance with the various embodiments of this invention.

In general, the various embodiments of the MN 12 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. In other embodiments the node may not include a transmitter and a receiver that is capable of wireless communications with a network via a wireless link, as wired connections may be used instead via a cable or wiring, including one or both of electrical and optical interconnections.

The memories 8A and 12A may be of any type suitable to the local technical environment and may be implemented using any suitable data storage technology, such as semiconductor-based memory devices, magnetic memory devices and systems, optical memory devices and systems, fixed memory and removable memory. The data processors 8B and 12B may be of any type suitable to the local technical environment, and may include one or more of general purpose computers, special purpose computers, microprocessors, digital signal processors (DSPs) and processors based on a multi-core processor architecture, as non-limiting examples.

In general, the embodiments of this invention may be implemented by computer software executable by a data processor of the MN 12, such as the DP 12B, or by hardware circuitry, or by a combination of software and hardware circuitry. The embodiments of this invention may also be implemented by computer software executable by a data processor of the BSF 8, such as the DP 8B, or by hardware circuitry, or by a combination of software and hardware circuitry.

In an exemplary embodiment the bootstrapping procedure in accordance with the non-limiting embodiments of this invention comprises the following steps, which are described in further detail below with regard to FIG. 2.

A. In an initial bootstrapping request, the MN 12 presents the list 11 of authentication mechanisms it supports to the BSF 8 in a request. The MN 12 also includes the user's identity.

B. The BSF 8 decides on the authentication mechanism to be used for bootstrapping, based on the list 11 received from the MN 12 and other information (including as non-limiting examples the mechanisms that the BSF 8 itself supports, and the user's profile retrieved based on the user's identity). The BSF 8 then proceeds with the selected authentication mechanism, which typically includes responding with an authentication challenge. The BSF 8 also includes in the response an indication of the authentication mechanism chosen.

C. The MN 12 sends a new HTTP request to the BSF 8 containing the response to the challenge generated based on the authentication mechanism selected. The message also includes the original list 11 of authentication mechanisms the MN 12 supports, only that this time it is integrity protected.

D. The BSF 8 verifies if the response to the challenge is correct, and considers the authentication of the MN successful in case the response corresponds to the expected response. If authentication is successful, and the list 11 received in step C is the same as that in step A, the BSF 8 responds to the MN with an HTTP successful response. The response message may also include an indication of the selected authentication mechanism, which is integrity protected.

E. The MN 12 receives the successful response and may verify that the authentication mechanism chosen is as indicated.

Since the first two messages (steps A and B) typically cannot be protected because the two parties have not authenticated each other, a MITM attacker may intercept message A and remove a strong authentication mechanism in the list, leaving only a weak authentication mechanism(s) in the list for the BSF 8 to choose from. This results in a "bid-down" attack, where the bootstrapping procedure is forced to be based on a weaker authentication mechanism even when stronger ones are supported by both parties (e.g., the BSF 8 and the MN 12). The procedure in the non-limiting and exemplary embodiments of this invention eliminates these kinds of "bid-down" attacks by having the MN 12 repeat the list in an integrity protected form in step C, thereby allowing the BSF 8 to detect a MITM attack if the lists in steps A and C do not match.

Describing the various aspects of this invention now in greater detail, in 3GPP the Ub interface (between the MN 12 and the BSF 8) is based on the HTTP Digest authentication. The same mechanism has been adopted in 3GPP2. For instance, for 3GPP and 3GPP2 AKA, Digest-AKA is used, whereas for bootstrapping for CDMA1x and CDMA EV-DO systems, HTTP Digest authentication with password-protected Diffie-Hellman (based on SMEKEY and MN 12-AAA Key respectively) is used (see 3GPP2 contribution: "Bootstrapping procedures for CDMA1x and CDMA1x EV-DO Systems", 3GPP2 TSG-S WG4, Portland, May 2005). In other words, possible authentication and bootstrapping mechanisms may include at least the followings:

3GPP AKA (the algorithm is not specified, it is operator specific);
3GPP2 AKA (SHA-1 is the algorithm mandated);
Bootstrapping based on SMEKEY; and
Bootstrapping based on MN-AAA Key.

In the future, more authentication mechanisms may be available and can readily be included in the MN-BSF selection procedure.

To eliminate the need to standardize a digest variant for each and every authentication mechanism in IETF, it is preferred that the list of supported authentication mechanisms and the selected authentication mechanism are embedded in the payload of the HTTP messages, rather than carrying this information in the Digest authentication headers.

Figure 2:
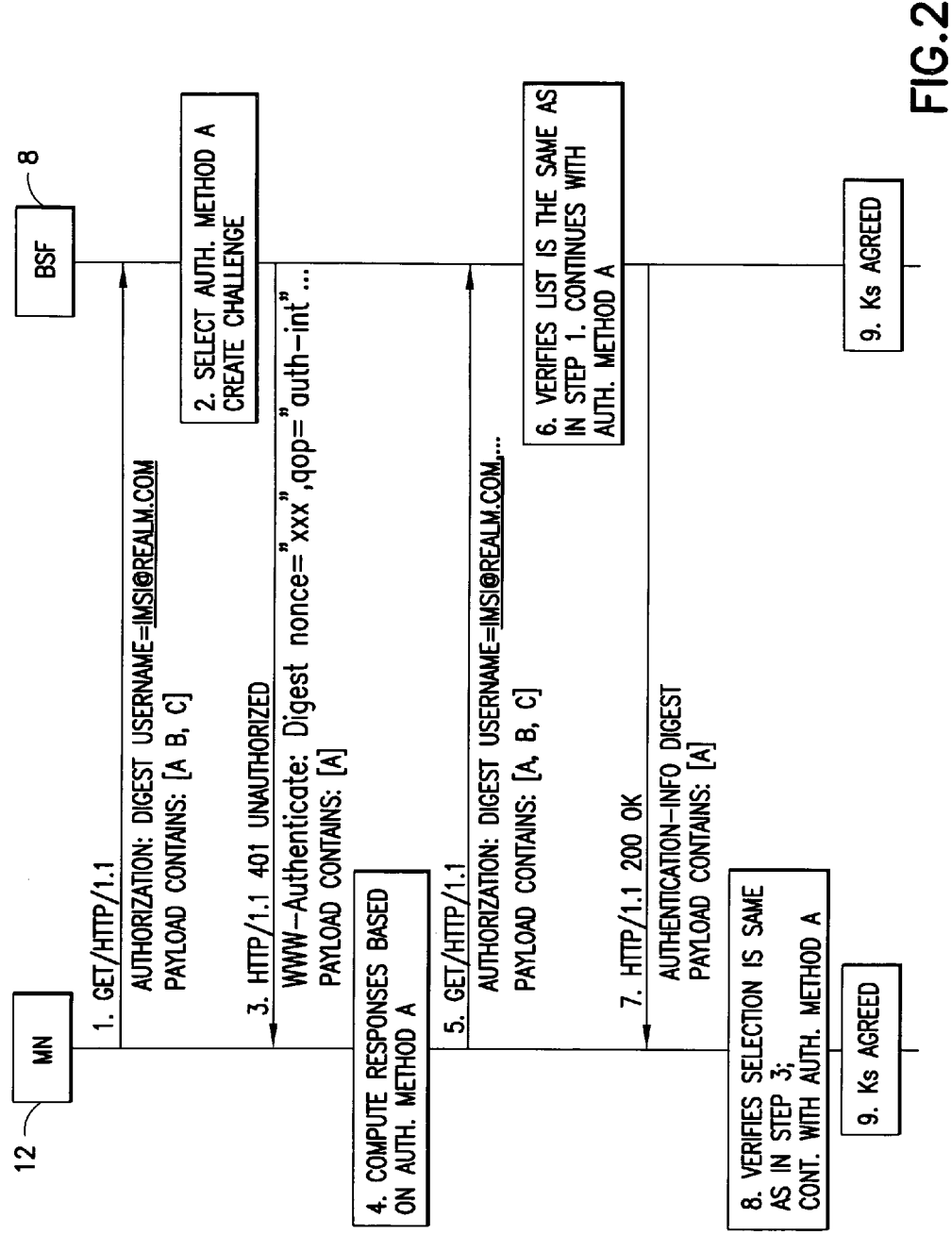
FIG. 2 illustrates a bootstrapping procedure with an authentication mechanism selection.

FIG. 2 shows the message sequence for a GBA bootstrapping procedure with authentication mechanism selection, and is explained in detail as follows:

1. The MN 12 sends an initial bootstrapping request in the form of an HTTP GET to the BSF 8. The MN 12 includes the user's identity in the Authorization header. Moreover, the list of supported authentication mechanisms (e.g. [A, B, C]) is included in the HTTP payload.

2. Upon receiving the bootstrapping request, the BSF 8 extracts the list of supported authentication mechanisms from the payload. Based on the extracted authentication mechanisms, the list of authentication mechanisms the BSF 8 itself supports, the user profile (retrieved based on the user's identity), and possibly other information, the BSF 8 decides on the authentication mechanism to use for bootstrapping.

3. The BSF 8 sends an HTTP 401 Unauthorized response to the MN 12. The response comprises the appropriate information based on the selected authentication mechanism. For example, if 3GPP AKA is selected, the WWW-Authenticate header contains AKA parameters in accordance with IETF RFC 3310 "Digest AKA". In addition, the payload will include an indication of the selected authentication mechanism (in this case, A). In addition, the quality of protection (qop) for Digest authentication is set to "auth-int", indicating that integrity protection of payload is required.

4. The MN 12 retrieves the selection of the BSF 8 from the payload and continues the authentication process according to the selection. Typically, this will comprise computing a response based on the challenge received and some shared secrets.

5. The MN 12 sends a new bootstrapping request in the form of HTTP GET to the BSF 8, with the computed response in accordance with the selected authentication mechanism. In addition, the payload comprises the original list of authentication mechanisms that the MN 12 supports. Since qop has been set to "auth-int", this original list is included in the computation of the Digest response and therefore is integrity protected.

6. The BSF 8 first verifies that the list presented in the payload matches that received in step 2. Only if a match is found does the BSF 8 continue with the authentication based on the selected mechanism. Typically, this comprises verifying the received digest response and computing a server-response for server-side authentication purpose.

7. The BSF 8 responds with an HTTP 200 OK message, indicating a successful authentication and bootstrapping operation. The message also includes the digest response computed by the BSF. The message may also include an indication of the selected authentication mechanism for reference by the MN 12. Similarly, this indication is integrity protected by setting qop to "auth-int".

8. The MN 12 may verify that the selected authentication mechanism is indeed the same as that indicated in step 3 It should be noted, that the mechanism works perfectly even without including the selected authentication mechanism into the HTTP 200 OK response.

9. Both the BSF 8 and the MN 12 derive the bootstrapping key based on the selected authentication and bootstrapping mechanism.

Figure 3:
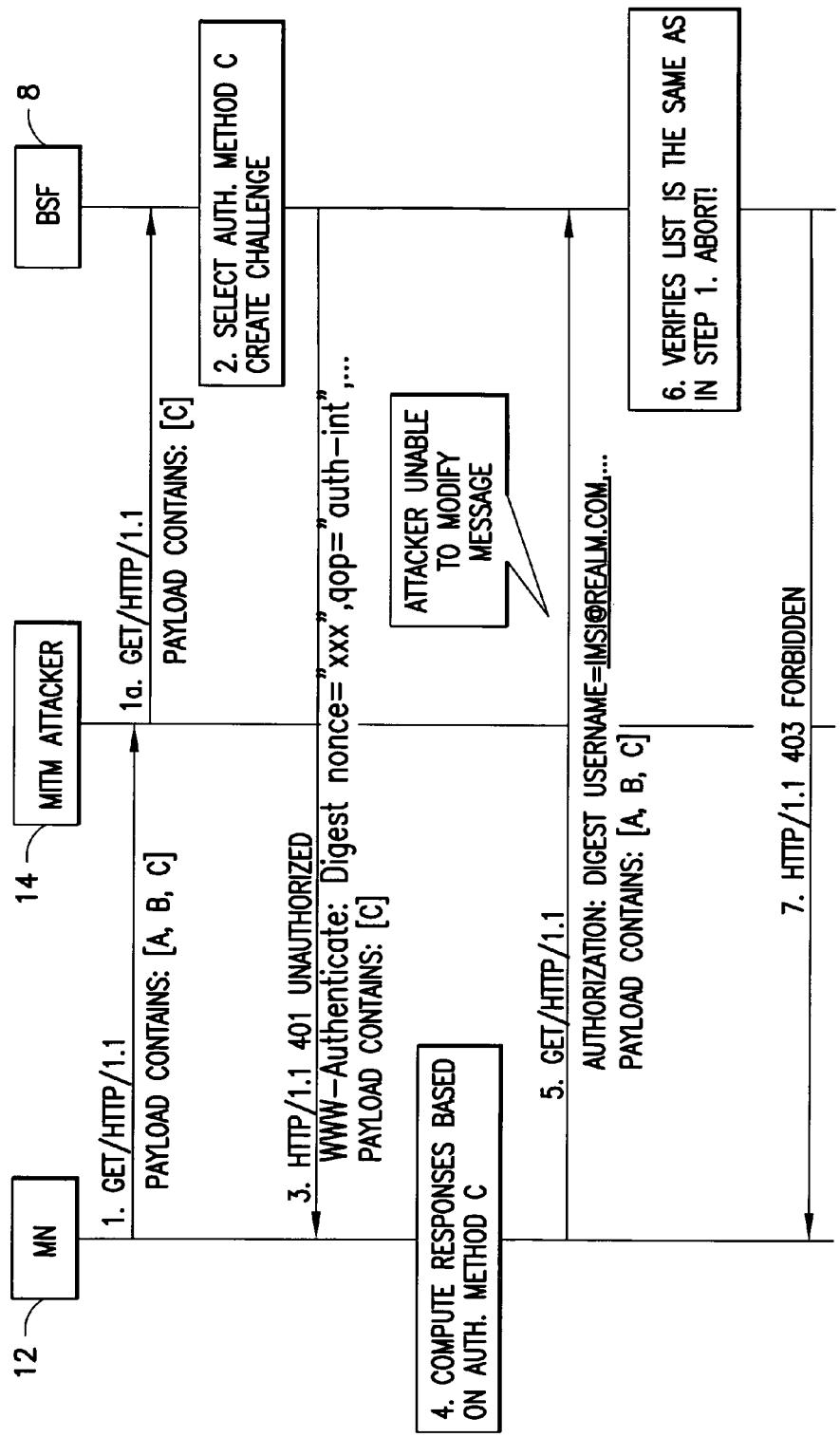
FIG. 3 is an example of an error scenario with a MITM attack.

FIG. 3 illustrates the scenario when a MITM attacker 14 attempts a bid-down attack as described above. The following explains each step in FIG. 3.

1. Same as step 1 as in FIG. 2. The original list 11 contains, by example, three supported mechanisms, namely, A, B and C.

1a. Message 1 is intercepted by the MITM attacker 14. The original list 11 is replaced with a list that contains only mechanism C, which may be the weakest of the three supported.

2. The BSF 8 extracts the list, which contains only mechanism C and therefore selects C and proceeds.

3. Same as step 3 in FIG. 2, with mechanism C indicated.

4. The MN 12 believes that BSF 8 has chosen mechanism C and therefore proceeds accordingly.

5. Same as step 6 in FIG. 2. Although MN 12 proceeds with mechanism C, it includes the original list of [A, B, C] in the payload, which is integrity protected, and therefore the MITM attacker 14 cannot make a modification to the message.

6. The BSF 8 while verifying the received list finds that it is not the same as the one received in step 2. It concludes that a bid-down attack has been launched and therefore aborts the bootstrapping procedure with a HTTP 403 Forbidden message.

Figure 4:
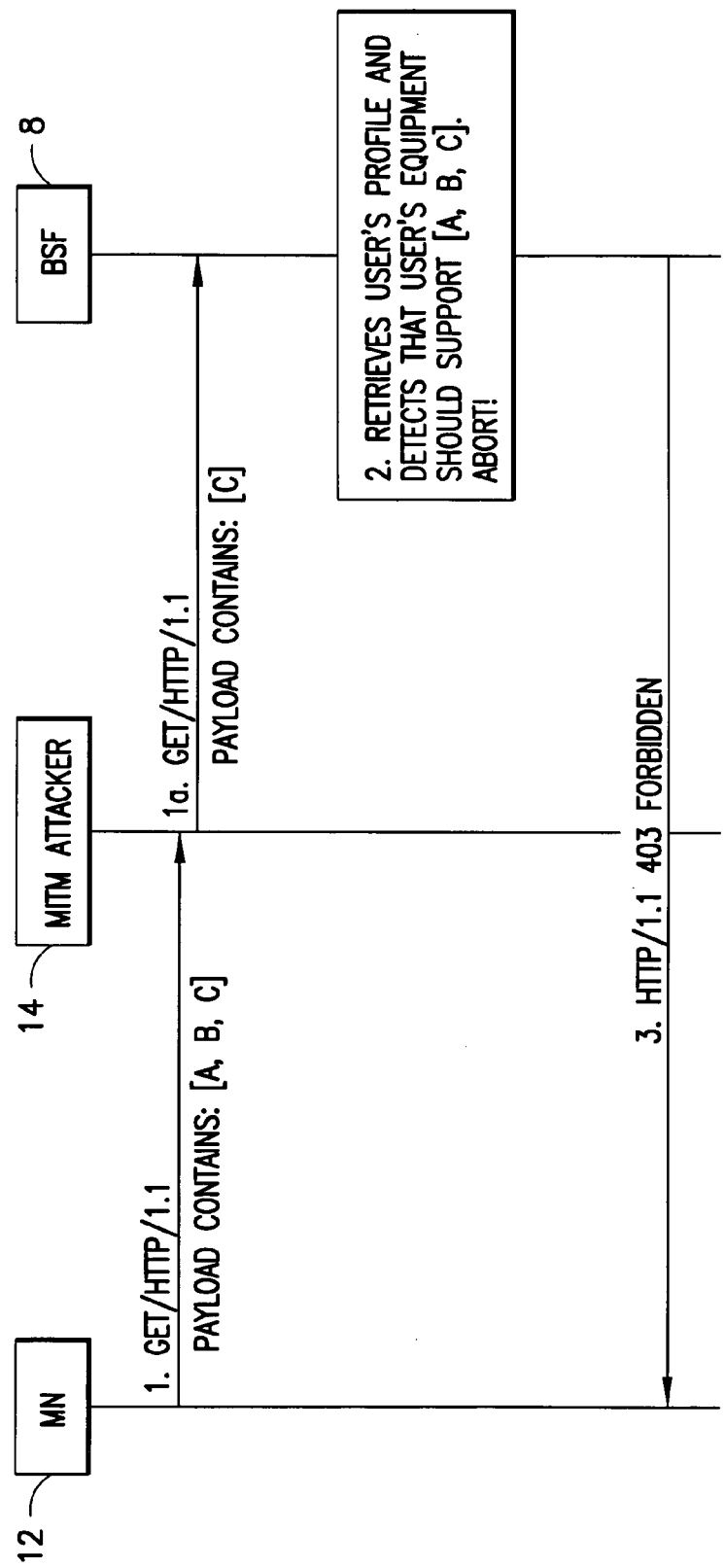
FIG. 4 is another example of an error scenario with a MITM attack.

Alternatively, the BSF 8 may detect this attack when the received list in step 2 does not match that as indicated in the user's profile, in which case it may also decide to abort the bootstrapping procedure. This is illustrated in steps 1, 2 and 3 of FIG. 4.

Figure 5:
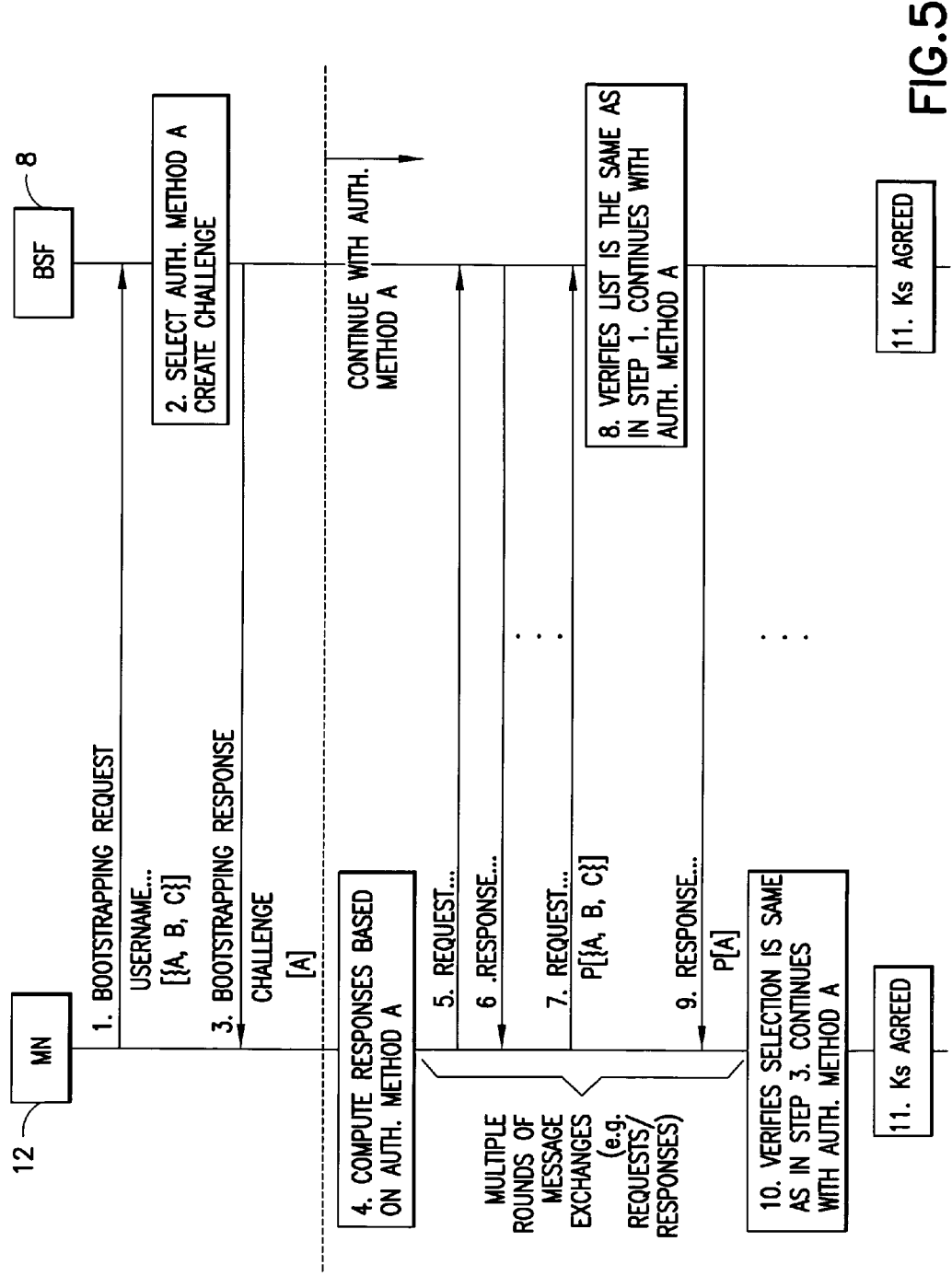
FIG. 5 shows an example of mechanism selection with bootstrapping that uses multiple rounds of message exchanges.

A further non-limiting embodiment of this invention pertains to those cases wherein the bootstrapping procedure for the selected authentication mechanism involves more than two rounds of requests/responses to complete. For example, bootstrapping based on Digest-AKA requires two rounds of request/response to complete. While the previous embodiment describes the cases where bootstrapping based on SMEKEY and MN-AAA Key can require two rounds of request/response as well, there may be cases where they require more than two rounds of request/response. In such cases, the exemplary embodiments of this invention still apply. This scenario is illustrated in FIG. 5 and is explained as follows:

1. In an initial bootstrapping request the MN 12 presents a list of authentication mechanisms it supports (e.g. {A, B, C}) to the BSF 8 in a request. The MN 12 also includes the user's identity. It may be assumed that in most cases this list is not protected.

2. The BSF 8 decides on the authentication mechanism to be used for bootstrapping, based on the list received from the MN 12 and other information (including the mechanisms that the BSF 8 itself supports, and the user's profile retrieved based on the user's identity). FIG. 5 assumes as a non-limiting example that mechanism A is chosen.

3. The BSF 8 then proceeds with the chosen authentication mechanism, which typically includes responding with an authentication challenge. The BSF 8 also includes in the response an indication of the authentication mechanism chosen (mechanism A in this example). Again, this indication may not be protected.

It should be noted that from this point on the MN 12 and BSF 8 continue with the selected mechanism (e.g. mechanism A as illustrated in FIG. 5). As was noted above, different mechanisms may require different numbers of rounds of message exchanges (e.g. requests/responses) to complete the bootstrapping procedure. For example, the Digest-AKA mechanism requires one more request/response after step 3 to complete; whereas for bootstrapping based on CAVE and the MN-AAA key, additional rounds may be required. In accordance with the exemplary embodiments of this invention, in one of these subsequent messages the MN 12 sends the original list 11 (as sent in message 1) again, but it is protected (e.g. integrity protected); while the BSF 8 may send the chosen mechanism (as sent in message 3) again, but it is protected (e.g. integrity protected). Note that while the MN 12 sends the original list 11 again protected, it is optional (but preferable) for the BSF 8 to send the chosen mechanism again protected. If such parameters are sent again protected, the other party is enabled to verify that the parameter sent is the same as the original parameter received, so as to detect any attempt by a MITM attacker to change the original parameters, which have been sent unprotected. In the following description, integrity protection is employed as an exemplary technique to protect the parameters. It should be understood that the parameters may as well be encrypted.

4. Still referring to FIG. 5, at step 4 the MN 12 computes the responses according to mechanism A.

5-6. There maybe multiple rounds of requests/responses between the MN 12 and the BSF 8 as explained. In some of these rounds, the chosen mechanism may not be able to provide the required integrity protection. Therefore the MN 12 and BSF 8 may not be able to send the parameters integrity protected.

7. At some certain point of the bootstrapping procedure, the MN 12 maybe able to send a message that includes data that is integrity protected. For example, in message 7 assume that the MN 12 is able to send such a message. If so, the MN 12 will include the original list 11 (the list {A, B, C} in the example) that is integrity protected, indicated by P[{A, B, C}] in FIG. 5.

8. Receiving the message, the BSF 8 verifies that the integrity protected list is the same as the list originally sent by the MN 12 in message 1. If not the BSF 8 may send an error response to the MN 12 to abort the operation (not shown). Alternatively, the BSF 8 may silently abort the operation.

9. At certain point of the bootstrapping procedure, the BSF 8 may be able to send a message that includes data that is integrity protected. For example, in message 9, assume that the BSF 8 is able to send such a message. The BSF may include the chosen mechanism (mechanism A in the example) that is integrity protected, indicated by P[A] in FIG. 5.

10. Receiving the message, the MN 12 verifies that the integrity protected chosen mechanism is the same as the one originally sent by the BSF 8 in message 2. If not, the MN 12 may send an error message to the BSF 8 to abort the operation (not shown). Alternatively, the MN 12 may silently abort the operation.

11. If successful, both parties are enabled to derive the bootstrapping key Ks according to the selected bootstrapping mechanism.

It can be noted that steps 7 and 8, and steps 9 and 10 (if present) need not be in the order as described, and that they need not be in consecutive messages. That is, the BSF 8 may send a message with the integrity protected parameter (the chosen mechanism) first, and the MN 12 may send a message with the integrity protected parameter (the list of supported mechanisms) at a later time. In addition, there may be more rounds of messages before and after the integrity protected messages are sent.

Figure 6B:
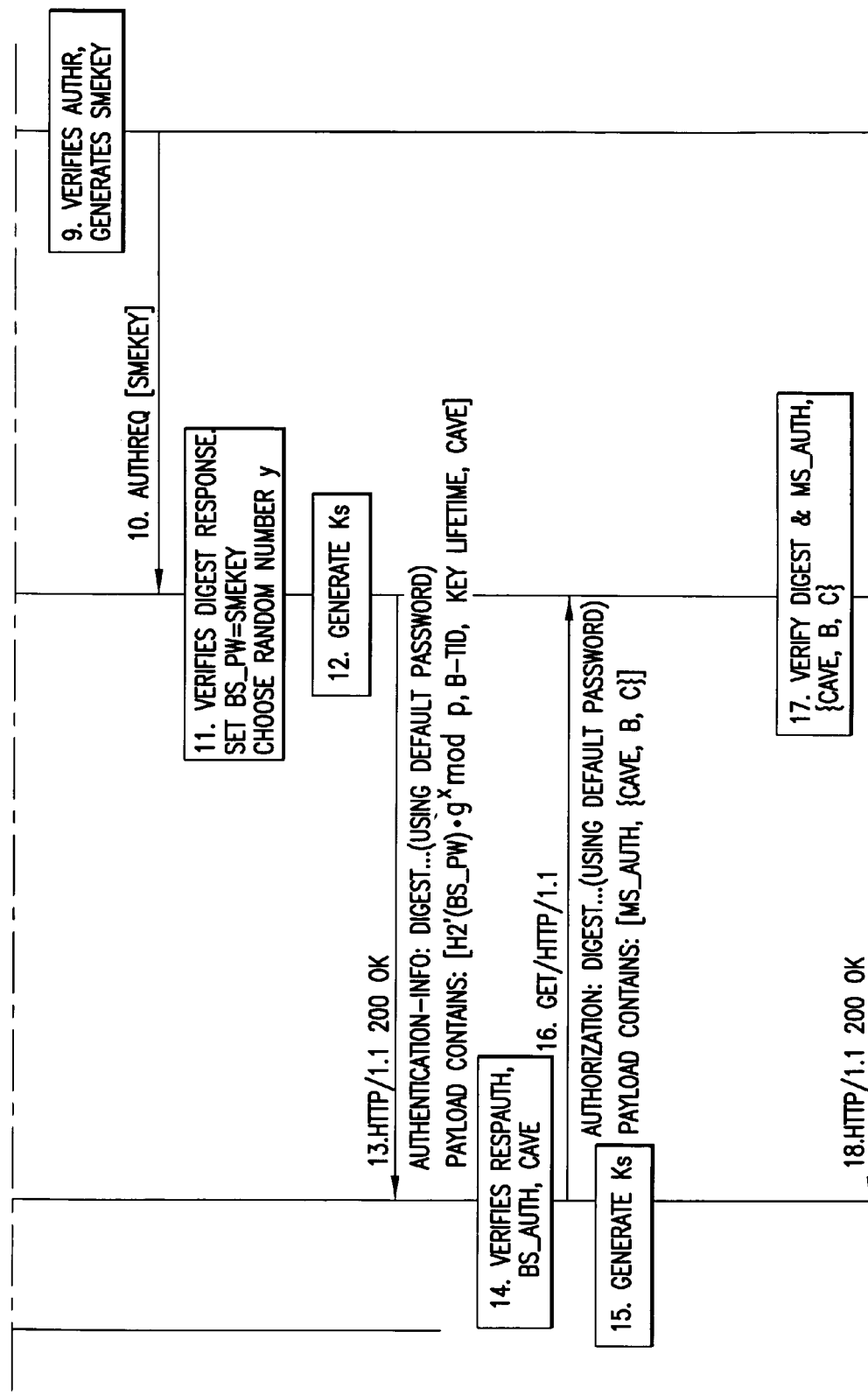
FIG. 6 shows a non-limiting example of negotiation using HTTP digest authentication.
Figure 7B:
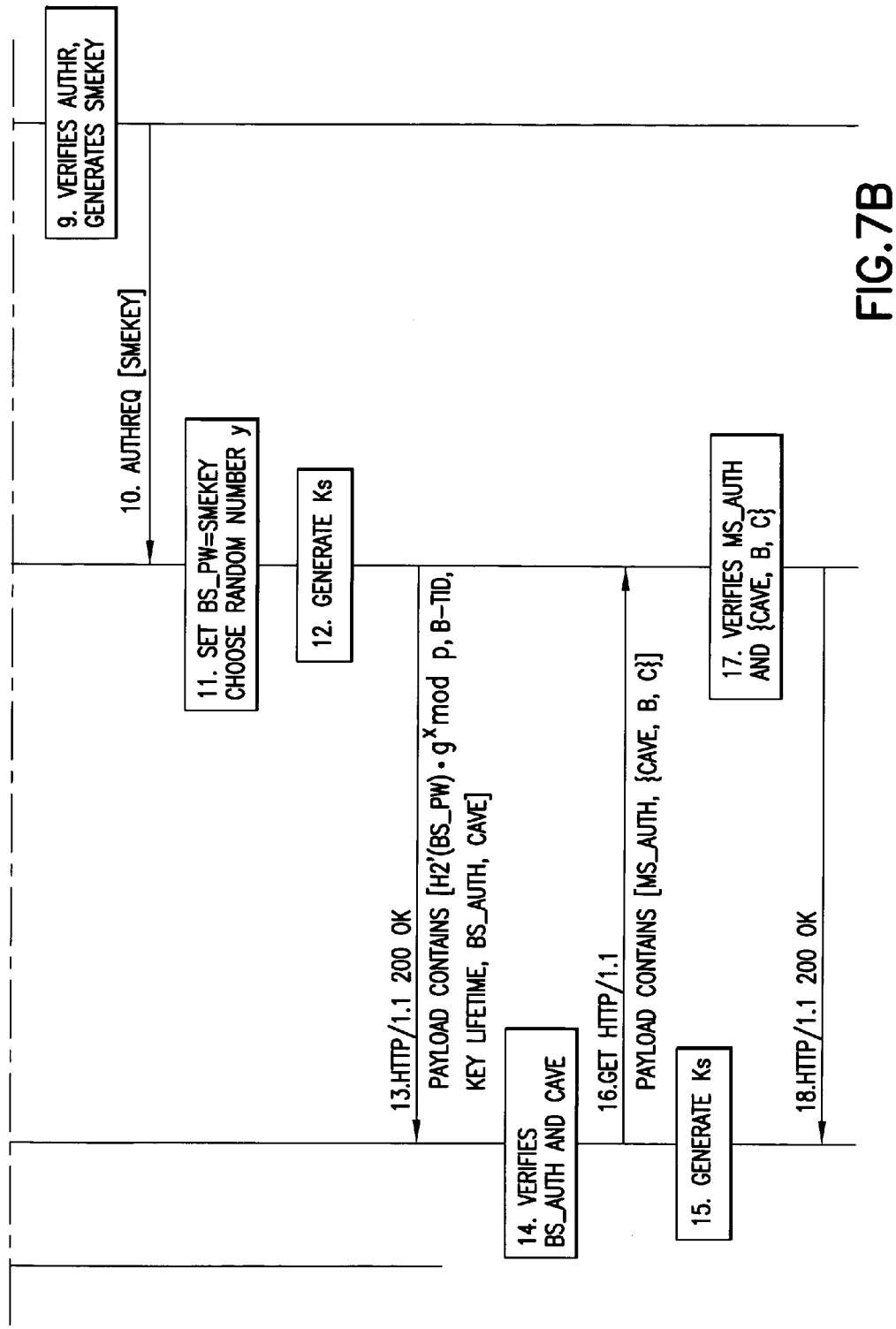
FIG. 7 shows a non-limiting example of negotiation using plain HTTP transport.

The following description provides exemplary implementations of embodiments of the invention using HTTP digest authentication (FIG. 6) and plain HTTP transport (FIG. 7). It should be noted that the embodiments of the invention are not limited by these two examples, and may be implemented using other transport/authentication mechanisms as well (e.g. the Extensible Authentication Protocol (EAP)). In the following descriptions, the parameters needed for mechanism negotiation (the list 11 of supported mechanisms, sent by the MN 12, and the chosen mechanism, sent by the BSF 8) are assumed to be sent in the payloads of the HTTP messages. Note, however, that these parameters may alternatively be carried in appropriate headers in the HTTP messages.

HTTP Dijest Authentication

In this exemplary implementation, HTTP digest authentication with password protected Diffie-Hellman is used for bootstrapping. A default password (e.g. "11 . . . 1") maybe used as the digest password, so mutual authentication between the MN 12 and BSF 8 is actually based on the password protected Diffie-Hellman mechanism, using MS_AUTH and/or BS_AUTH. The details of the password protected Diffie-Hellman mechanism is based on WKEY (Wireless LAN Key) generation procedures described in the Wireless LAN interworking specification, which is currently being specified in 3GPP2 (See Section 7.1.1 of the 3GPP2 X.P0028 "Wireless LAN interworking", attached as Exhibit D to U.S. Provisional Patent Application No. 60/692,855, filed Jun. 21, 2005).

FIG. 6 illustrates one exemplary implementation of bootstrapping mechanism negotiation with the chosen mechanism being CAVE, where the bootstrapping procedure with CAVE requires three rounds of HTTP request/response altogether. The scenario for bootstrapping based on MN-AAA Key is very similar, and therefore is not described in further detail.

The following describes the steps shown in FIG. 6 in more detail.

1. The MN 12 sends a HTTP GET request towards the BSF 8. The user's identity, in the form of "IMSI@realm.com", is included as the username in the Authorization header. In addition, the user sends the list 11 of supported bootstrapping/authentication mechanisms in the payload (e.g. {CAVE, B, C}, meaning that the MN 12 supports CAVE and two other mechanisms, B and C).
2. The BSF 8 retrieves the list of supported mechanisms from the payload and makes a decision based on the list, the username, the user profile, and/or other information, and the BSF 8 selects CAVE as the bootstrapping mechanism in this non-limiting example. From this point on the bootstrapping is based on the chosen mechanism, which is CAVE. The BSF 8 generates a 32-bit RAND challenge value.
3. The BSF 8 sends a HTTP 401 response to the MN 12. The RAND is base64-encoded and carried in the once field of the WWW-Authenticate header. The field "qop-options" is set to "auth-int". The payload also contains an indication that CAVE is the chosen mechanism.
4. The MN 12 extracts the chosen mechanism from the payload and proceeds accordingly. For CAVE, the RAND challenge value received by the GBA Function is sent to the R-UIM or the 1× terminal as a simulated Global Challenge.
5. The 1× terminal (or the R-UIM) responds to the global challenge with an AUTHR and the SMEKEY. The AUTHR and the SMEKEY are then delivered to the GBA Function.
6. The GBA Function sets MS_PW to be the SMEKEY. It also generates a secret random number "x" for the Diffie-Hellman method. For the Digest authentication, the GBA Function also generates a 32-bit random number, CRAND, to be used as a client once.
7. The MN 12 sends another HTTP GET request to the BSF 8 with an appropriate Authorization header. The Digest response is assumed to be computed in accordance to RFC2617 (attached as Exhibit C to U.S. Provisional Patent Application No. 60/692,855, filed Jun. 21, 2005) using the default password. The CRAND is base64-encoded and carried in the coonce field. The HTTP payload contains the AUTHR and the MS_RESULT, i.e., $g^x$ mod p covered by the hash of the SMEKEY with MS_PW=SMEKEY).
8. The BSF 8 verifies that the received MS_RESULT is not zero. The BSF 8, acting as a VLR, sends an AUTHREQ to the HLR/AC 4'. The AUTHREQ includes the RAND, SYSACCTYPE=GAA access and AUTHR parameters. The ESN parameter is set to all zeros. The SYSCAP parameter is set to indicate that Authentication parameters were requested on this system access (bit-A=1) and that Signaling Message Encryption is supported by the system (bit-B=1). All other bits of the SYSCAP parameter are preferably set to zero.
9. The HLR/AC 4' verifies the AUTHR and generates the SMEKEY.
10. The HLR/AC 4' responds with a TIA-41 AUTHREQ that includes the SMEKEY parameter. If authentication fails, the AUTHREQ will only include an access deny indication.
11. The BSF 8 authenticates the MN 12 by verifying the Digest response using the default password. If successful, the BSF 8 sets BS_PW=SMEKEY and generates a random secret number "y" for the Diffie-Hellman method.
12. The BSF 8 generates the 128-bit Ks. The B-TID value is also generated in the format of NAI by taking the base64 encoded RAND value from step 2, and the BSF 8 server name, i.e. base64encode(RAND)@BSF_servers_domain_name.
13. The BSF 8 sends a 200 OK response to the MN 12. The server digest response, "rspauth", is calculated according to RFC 2617 (Exhibit C to U.S. Provisional Patent Application No. 60/692,855, filed Jun. 21, 2005) using the default password and carried in the Authentication-Info header. The payload of the 200 OK response also contains the BS_RESULT, i.e. $g^y$ mod p, covered by the hash of SMEKEY, the B-TID, the lifetime of the key Ks, an indication of the chosen mechanism (CAVE) and BS_AUTH. Note that integrity protection can be provided by including the data in the computation of BS_AUTH. One exemplary way is as follows:
BS_AUTH[data]=SHA-1(0x00000005|0x00000C80+sizeof (data)|BS_PARAM|data|BS_PARAM|data) modulo $2^{128}$, where data is the information that needs to be integrity protected, and in this case includes the B-TID, key lifetime, and the indication of the chosen mechanism (CAVE).
14. The MN 12 verifies rspauth according to RFC 2617 (Exhibit C to U.S. Provisional Patent Application No. 60/692, 855, filed Jun. 21, 2005) using the default password, and verifies that BS_AUTH equals XBS_AUTH' (using the same calculation as BS_AUTH). The MN 12 also verifies that the indicated chosen mechanism is CAVE. If successful, the server and the message sent are authenticated. If not successful, the MN 12 aborts the bootstrapping procedure and may retry immediately or at a later time.

15. The MN 12 generates the 128-bit Ks.
16. The MN 12 sends another HTTP GET request to BSF 8 with an appropriate Authorization header. The digest response is computed using the default password. The payload contains the original list of supported mechanisms ({CAVE, B, C} in this example) and MS_AUTH. Integrity protection can be provided by including the data that needs to be protected in the computation of MS_AUTH. One exemplary way is as follows:

MS_AUTH[data]=SHA-1(0x00000004|0x00000C80+ sizeof(data)|MS_PARAM|data|MS_PARAM|data) modulo $2^{128}$, where data is the information that needs to be integrity protected, which in this case is the original list of supported mechanisms ({CAVE, B, C}).

17. The BSF 8 verifies the digest response using the default password and authenticates the MN 12 by verifying that the MS_AUTH equals XMS_AUTH (same calculation as MS_AUTH). The BSF 8 also verifies that the list of supported mechanisms is the same as the list received in step 2. If not, the BSF 8 may send a HTTP 403 Forbidden response, or other error responses to the MN 12, or silently abort the bootstrapping procedure (not shown).
18. If successful, the BSF 8 sends a 200 OK response to the MN 12.

Note that there are many possible variations in the above procedure. However, the basic idea of the invention remains the same and therefore not all possible variations are described. One variation is that MS_AUTH and BS_AUTH are used as the digest password in steps 16 and 17 respectively, in which case the "data" may not be included in the calculation of MS_AUTH and BS_AUTH. Integrity protection in that case will be provided by the digest authentication mechanism. Yet another variation is that instead of using MS_AUTH on MN 12 side and BS_AUTH in BSF 8 side, only MS_AUTH or BS_AUTH will be used in both sides. Again, the "data" is not included in the computation of MS_AUTH or BS_AUTH, and integrity protection is provided by the digest authentication mechanism.

Plain HTTP Transport

In this non-limiting example, plain HTTP is used as a transport mechanism for the MN 12 and BSF 8 to exchange the password protected Diffie-Hellman parameters. Mutual authentication between the MN 12 and BSF 8 is based on the password protected Diffie-Hellman mechanism using MS AUTH and BS_AUTH.

FIG. 7 illustrates one exemplary implementation of a bootstrapping mechanism negotiation with the chosen mechanism being CAVE, and where the bootstrapping procedure with CAVE requires three rounds of HTTP GET/response. The scenario for bootstrapping based on MN-AAA Key is very similar and therefore is not included here. The following describes the steps in more detail.

1. The MN 12 sends an HTTP GET request towards the BSF 8. The user's identity, in the form of "IMSI@realm.com", is included in the payload. In addition, the user includes the list of supported bootstrapping/authentication mechanism in the payload (e.g. {CAVE, B, C}, meaning that the MN 12 supports CAVE and two other mechanisms, B and C).
2. The BSF 8 retrieves the list of supported mechanisms from the payload and make a decision based on the list, the username (also from the payload), the user profile, and/or other information. Assume that the BSF 8 selects CAVE as the bootstrapping mechanism, and from this point on the bootstrapping is based on the chosen mechanism (e.g., CAVE).

The BSF 8 generates a 32-bit RAND challenge value.
3. The BSF 8 sends a response (e.g. 200 OK) to the MN 12. The RAND is base64-encoded and carried in the payload. The payload also contains an indication that CAVE is the chosen mechanism.
4. The RAND challenge value received by the GBA Function is sent to the R-UIM or the IX terminal as a simulated Global Challenge.
5. The IX terminal (or the R-UIM) responds to the global challenge with an AUTHR and the SMEKEY. The AUTHR and the SMEKEY are then delivered to the GBA Function.
6. The GBA Function sets MS_PW to be the SMEKEY. It also generates a secret random number "x" for the Diffie-Hellman method.
7. The MN 12 sends another HTTP GET request to the BSF 8. The HTTP payload contains the AUTHR and the MS_RESULT, i.e., $g^x$ mod p covered by the hash of the SMEKEY.
8. The BSF 8 verifies that the received MS_RESULT is not zero. The BSF 8, acting as a VLR, sends an AUTHREQ to the HLR/AC 4'. The AUTHREQ includes the RAND, SYSACCTYPE=GAA access and AUTHR parameters. The ESN parameter is set to all zeros. The SYSCAP parameter is set to indicate that Authentication parameters were requested on this system access (bit-A=1) and that Signaling Message Encryption is supported by the system (bit-B=1). All other bits of the SYSCAP parameter can be set to zero.
9. The HLR/AC verifies the AUTHR and generates the SMEKEY.
10. The HLR/AC responds with a TIA-41 AUTHREQ that includes the SMEKEY parameter. If authentication fails, the AUTHREQ may include only an access deny indication.
11. The BSF 8 sets BS_PW=SMEKEY and generates a random secret number "y" for the Diffie-Hellman method.
12. The BSF 8 generates the 128-bit Ks. The B-TID value can also be generated in the format of NAI by taking the base64 encoded RAND value from step 2, and the BSF 8 server name, i.e. base64encode(RAND)@BSF_servers_domain-_name.
13. The BSF 8 sends a response (e.g. 200 OK) to the MN 12. The payload of the response can contain the BS_RESULT, i.e. $g^y$ mod p, covered by the hash of SMEKEY, the B-TID, the lifetime of the key Ks, an indication of the chosen mechanism (CAVE) and BS_AUTH. Note that integrity protection can be provided by including the data in the computation of BS_AUTH. One exemplary way is as follows:

BS_AUTH[data]=SHA-1(0x00000005|0x00000C80+sizeof (data)|BS_PARAM|data|BS_PARAM|data) modulo $2^{128}$, where data is the information that needs to be integrity protected, and includes the B-TID, lifetime, and the indication of the chosen mechanism (CAVE).

14. The MN 12 verifies that the BS_AUTH equals the XBS_AUTH (same calculation as BS_AUTH). The MN 12 also verifies that the indicated chosen mechanism is CAVE. If successful, the server and the message sent are authenticated. If not successful, the MN 12 preferably aborts the bootstrapping procedure and may retry immediately or at a later time.
15. The MN 12 generates the 128-bit Ks.
16. The MN 12 sends another HTTP GET request to the BSF 8. The payload contains MS_AUTH. The payload may also contain the original list of supported mechanisms ({CAVE, B, C} in this example) and MS_AUTH. Integrity protection can be provided by including the data that needs to be protected in the computation of MS_AUTH. One exemplary way is as follows:

MS_AUTH[data]=SHA-1(0x00000004|0x00000C80+ sizeof(data)|MS_PARAM|data|MS_PARAM|data) modulo $2^{128}$, where data is the information that needs to be integrity protected, and the original list of supported mechanisms ({CAVE, B, C}).

17. The BS authenticates the MN 12 by verifying that the MS_AUTH equals XMS_AUTH (same calculation as MS_AUTH). The BS also verifies that the list of supported mechanisms is the same as the list received in step 2. If not, the BSF 8 may send a HTTP 403 Forbidden response, or other error responses to the MN 12, or it may silently abort the bootstrapping procedure (not shown).

18. The BSF 8 sends response (e.g. 200 OK) to the MN 12.

Note that there may be many possible variations in the above procedure. However, the basic approach found in the non-limiting embodiments of the invention remains the same.

XML Schema Definition

In 3GPP GBA, an HTTP payload carries the B-TID (Bootstrapping Transaction Identifier) and the key lifetime in the final 200 OK response if bootstrapping is successful. The associated XML schema is defined in Annex C of 3GPP TS 24.109. 3GPP2 extends this schema to allow the payload to carry other information needed for bootstrapping based on SMEKEY and MN-AAA Key, these include the parameter AUTHR (for CAVE) and the password-protected Diffie-Hellman parameters. The non-limiting and exemplary embodiments of this invention provide for the XML schema be further extended to include the list of authentication mechanisms, as well as the indication of the selected mechanism. One possible definition of the schema is as follows, where the extensions used to support the non-limiting and exemplary embodiments of this invention are shown underlined and in italics.

```
<?xml version="1.0" encoding="UTF-8"?>
<xs:schema targetNamespace="uri:3gpp2-gba"
    xmlns:gba="uri:3gpp2-gba"
    xmlns:xs="http://www.w3.org/2001/XMLSchema">
    <!-- definition of the root element containing B-TID, key lifetime,
    and other parameters -->
<xs:complexType name="bootstrappingInfoType">
    <xs:sequence>
        <xs:element name="btid" type="xs:string" minOccurs="0"/>
        <xs:element name="lifetime" type="xs:dateTime"
        minOccurs="0"/>
        <xs:element name="authr" type="xs:base64Binary"
        minOccurs="0"/>
        <xs:element name="ms_result" type="xs:base64Binary"
        minOccurs="0"/>
        <xs:element name="bs_result" type="xs:base64Binary"
        minOccurs="0"/>
        <xs:element name="auth_list" minOccurs="0">
            <xs:simpleType>
                <xs:list itemType="gba:authType"/>
            </xs:simpleType>
        </xs:element>
        <xs:element name="auth" type="gba:authType" minOccurs="0"/>
    </xs:sequence>
</xs:complexType>
<!-- definition of authentication and bootstrapping mechanism type -->
<xs:simpleType name="authType">
    <xs:restriction base="xs:string">
        <xs:enumeration value="3GPP-AKA"/>
        <xs:enumeration value="3GPP2-AKA"/>
        <xs:enumeration value="CAVE"/>
        <xs:enumeration value="MN-AAA"/>
    </xs:restriction>
</xs:simpleType>
```

```
<!-- the root element -->
<xs:element name="BootstrappingInfo" type=
"gba:bootstrappingInfoType"/>
</xs:schema>
```

In the schema, the element "auth_list" is used to carry the list 11 of authentication and bootstrapping mechanisms in messages 1 and 5 in FIGS. 2 and 3. The element "auth" is used to carry an indication of the BSF-selected mechanism in messages 3 and 7 in FIGS. 2 and 3. The type "authType" is defined to be an enumeration of the current authentication and bootstrapping mechanisms in the various standards, and may take the following exemplary values:

"3GPP-AKA": bootstrapping based on 3GPP AKA mechanism;

"3GPP2-AKA": bootstrapping based on 3GPP2 AKA mechanism;

"CAVE": bootstrapping based on SMEKEY (CAVE); and

"MN-AAA": bootstrapping based on MN-AAA Key.

When more authentication mechanisms are supported in GBA, corresponding names of the new authentication mechanisms are added to authType.

Alternatively, instead of having both "3GPP-AKA" and "3GPP2-AKA", only "AKA" may be defined in the schema. The actual mechanism used in AKA is then preconfigured by the network operator.

Note that the above schema is exemplary in nature, and other techniques are possible to achieve the same goal. In addition, the schema may be extended to include other information that is useful to be carried in the payloads. For example, in the exemplary implementation using plain HTTP as transport for carrying the password protected Diffie-Hellman described above, the payloads preferably carry other information such as the username, RAND, MS_AUTH, BS_AUTH, and so on. The schema thus can be extended accordingly to allow these parameters to be carried as well.

It should be noted that the names of the authentication mechanisms in the above definition are exemplary, and are used herein without a loss of generality.

It should be appreciated that the exemplary embodiments of this invention described in FIGS. 1-7 are simple, efficient and secure, do not require standardization efforts in IETF, are extendable to support future authentication and bootstrapping mechanisms, and support both 3GPP and 3GPP2 systems.

In accordance with an apparatus, method and computer program product in accordance with non-limiting embodiments of this invention there is provided a technique for execution by a network device or node, such as the BSF 8, and a device or node, such as the MN 12, to execute a bootstrapping procedure comprising, in an initial bootstrapping request, the MN 12 sending the BSF 8 a first request message that includes a list of authentication mechanisms that the MN 12 supports; the BSF 8 determining an authentication mechanism to be used for bootstrapping, based at least on the list received from the MN 12, and proceeding with the selected authentication mechanism and including in a response message to the MN 12 an indication of the determined authentication mechanism; the MN 12 sending a second request message, which is at least partially integrity protected, to the BSF 8 based on the determined authentication mechanism, the second request message including the list of authentication mechanisms that the MN 12 supports in an integrity protected form. If authentication is successful, and if the list received in the second request message matches the list received in the first request message, the network may respond to the MN 12 with a successful response message, which is at least partially integrity protected, where the successful response message includes an indication of the selected authentication mechanism in an integrity protected form. The MN 12, upon receiving the successful response message, may verify that the authentication mechanism used by the MN 12 matches the authentication mechanism selected by the BSF 8. The first request message sent by the MN 12 may also comprise the user's identity, which may be used by the BSF 8 to aid in selecting the authentication mechanism.

Multiple message rounds may be accommodated by the teachings in accordance with the invention. Negotiation may proceed by Digest authentication, or it may proceed using HTTP, as non-limiting examples.

Various modifications and adaptations may become apparent to those skilled in the relevant arts in view of the foregoing description, when read in conjunction with the accompanying drawings. As but some examples, the use of other similar or equivalent message types and message orderings may be attempted by those skilled in the art. Further, the exemplary embodiments of this invention are not limited for use with mobile nodes or nodes capable of mobility, but may be used as well with devices and nodes that are fixed in location and/or are not capable of mobility. However, all such and similar modifications of the teachings of this invention will still fall within the scope of the non-limiting embodiments of this invention. Furthermore, some of the features of the various non-limiting embodiments of the non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
receiving at a wireless network a first message that is comprised of a list of authentication mechanisms supported by a node;
determining in the wireless network an authentication mechanism to be used for bootstrapping, based at least on the list received from the node, and including, in a first response message to the node, information pertaining to the determined authentication mechanism;
receiving at the wireless network a second message that is at least partially integrity protected based on the determined authentication mechanism, the second message comprising the list of authentication mechanisms that the node supports in an integrity protected form; and
when authentication is successful, and if the list received in the second message matches the list received in the first message, responding to the node with a second response message that is at least partially integrity protected, where the second response message may contain an indication of the determined authentication mechanism in an integrity protected form.

2. The method of claim 1, where the first message further comprises an identification of a user of the node.

3. The method of claim 1, where at least the steps of determining in the wireless network and responding to the node are executed by a bootstrapping server function.

4. The method of claim 1, where the first message is sent as an HTTP GET that comprises an identification of a user of the node, where the list is included in an HTTP payload.

5. The method of claim 1, where the first response message is sent as an HTTP 401 unauthorized response.

6. The method of claim 1, where the second message is sent as an HTTP GET that comprises a computed response in accordance with the determined authentication mechanism.

7. The method of claim 1, where the second response message is sent as an HTTP 200 OK message.

8. A non-transitory computer readable storage medium embodied with a computer program including computer code the execution of which by a data processor of a node comprises operations of:
sending a wireless network a first message that is comprised of a list of authentication mechanisms supported by the node;
receiving a first response message from the wireless network, the first response message comprising information pertaining to an authentication mechanism selected by the wireless network from the list provided by the node in the first message;
sending a second message to the wireless network that is at least partially integrity protected, the second message comprising the list of authentication mechanisms that the node supports in an integrity protected form; and
when authentication is successful, and if the list sent in the second message matches the list sent in the first message, receiving a second response message that is at least partially integrity protected, where the second response message comprises an indication of the selected authentication mechanism in an integrity protected form.

9. The non-transitory computer readable storage medium of claim 8, where first message further comprises an identification of a user of the node.

10. The non-transitory computer readable storage medium of claim 8, where the first message is sent as an HTTP GET that comprises an identification of a user of the node, where the list is included in an HTTP payload.

11. The non-transitory computer readable storage medium of claim 8, where the first response message is received as an HTTP 401 Unauthorized response.

12. The non-transitory computer readable storage medium of claim 8, where the second message is sent as an HTTP GET that comprises a computed response in accordance with the selected authentication mechanism.

13. The non-transitory computer readable storage medium of claim 8, where the second response message is received as an HTTP 200 OK message.

14. The non-transitory computer readable storage medium of claim 8, further comprising verifying that the authentication mechanism used by the node matches the authentication mechanism selected by the wireless network.

15. A device, comprising:
a data processor; a transmitter; and
a receiver,
the device configured to:
send to a network via the transmitter a first message that is comprised of a list of authentication mechanisms supported by the device;
receive from the network via the receiver a first response message, the first response message comprising information pertaining to an authentication mechanism selected by the network from the list;
integrity protect the list of authentication mechanisms supported by the device and send via the transmitter a second message to the network that is at least partially integrity protected, the second message comprising the list of authentication mechanisms that the device supports in an integrity protected form; and
when authentication is successful, and if the list sent in the second message matches the list sent in the first message, receive a second response message from the network that is at least partially integrity protected, where the second response message comprises an indication of the selected authentication mechanism in an integrity protected form.

16. The device of claim 15, wherein the first message further comprises an identification of a user of the device.

17. The device of claim 15, where at least the first and second response messages are received from a bootstrapping server function that comprises a part of the network.

18. The device of claim 15, where the first message is sent as an HTTP GET that comprises an identification of a user of the device, where the list is included in an HTTP payload.

19. The device of claim 15, where the first response message is received as an HTTP 401 Unauthorized response.

20. The device of claim 15, where the second message is sent as an HTTP GET that comprises a computed response in accordance with the selected authentication mechanism.

21. The device of claim 15, where the second response message is received as an HTTP 200 OK message.

22. The device of claim 15, further configured to verify that the authentication mechanism used by the device matches the authentication mechanism selected by the network.

23. A non-transitory computer readable storage medium embodied with a computer program including computer code the execution of which by a data processor of a wireless network element comprises operations of:
receiving a first message from a node that is comprised of a list of authentication mechanisms supported by the node;
determining an authentication mechanism to be used for bootstrapping, based at least on the list received from the node;
sending a first response message to the node, the first response message comprising information pertaining to the determined authentication mechanism;
receiving a second message from the node that is at least partially integrity protected, the second message comprising the list of authentication mechanisms that the node supports in an integrity protected form; and
when authentication is successful, and if the list received in the second message matches the list received in the first message, sending a second response message to the node that is at least partially integrity protected, where the second response message comprises an indication of the selected authentication mechanism in an integrity protected form.

24. The non-transitory computer readable storage medium of claim 23, where the first message further comprises an identification of a user of the node, further comprising retrieving a user profile based on the user identification, and where the determining operation considers the user profile.

25. The non-transitory computer readable storage medium of claim 23, where a wireless network is comprised of a bootstrapping server function.

26. The non-transitory computer readable storage medium of claim 23, where the first message is received as an HTTP GET that comprises an identification of a user of the node, where the list is included in an HTTP payload.

27. The non-transitory computer readable storage medium of claim 23, where the first response message is sent as an HTTP 401 Unauthorized response.

28. The non-transitory computer readable storage medium of claim 23, where the second message is received as an HTTP GET that comprises a computed response in accordance with the determined authentication mechanism.

29. The non-transitory computer readable storage medium of claim 23, where the second response message is sent as an HTTP 200 OK message.

30. A network device, comprising:
a data processor;
a transmitter; and
a receiver,
the network device configured to:
receive from a node, via the receiver, a first message that is comprised of a list of authentication mechanisms supported by the node;
determine an authentication mechanism to be used for bootstrapping, based at least in part on the list received from the node;
send a first response message to the node via the transmitter, the first response message comprising information pertaining to the determined authentication mechanism;
receive from the node a second message that is at least partially integrity protected, the second message comprising the list of authentication mechanisms that the node supports in an integrity protected form; and
when authentication is successful, and if the list received in the second message matches the list received in the first message, send a second response message to the node that is at least partially integrity protected, where the second response message comprises an indication of the selected authentication mechanism in an integrity protected form.

31. The network device of claim 30, where the first message further comprises an identification of a user of the node and where the data processor is further operable to retrieve a user profile based on the user identification for consideration when determining the authentication mechanism to be used for bootstrapping.

32. The network device of claim 30, comprising a bootstrapping server function.

33. The network device of claim 30, where the first message is received as an HTTP GET that comprises an identification of a user of the node, where the list is included in an HTTP payload.

34. The network device of claim 30, where the first response message is sent as an HTTP 401 Unauthorized response.

35. The network of claim 30, where the second message is received as an HTTP GET that comprises a computed response in accordance with the determined authentication mechanism.

36. The network device of claim 30, where the second response message is sent as an HTTP 200 OK message.

37. A system, comprising:
a device; and
a network device, said device comprising a data processor coupled to a transmitter and to a receiver and operable to send to the network device via the transmitter a first message that is comprised of a list of authentication mechanisms supported by the device, said network device comprising a data processor coupled to a transmitter and to a receiver and operable to select an authentication mechanism from the list, said device receiving from the network device via the receiver a first response message, the first response message comprising information pertaining to the authentication mechanism selected by the network device from the list, said device data processor operable to integrity protect the list of authentication mechanisms supported by the device and to send via the transmitter a second message to the network device that is at least partially integrity protected, the second message comprising the list of authentication mechanisms that the device supports in an integrity protected form, and when authentication is successful, and if the list sent in the second message matches the list sent in the first message, said device is configured to receive via the receiver a second response message from the network device that is at least partially integrity protected, where the second response message comprises an indication of the authentication mechanism selected by the network device in an integrity protected form.

38. The system of claim 37, where the network device is comprised of a bootstrapping server function.

39. A method comprising:
sending to a wireless network a first message that is comprised of a list of authentication mechanisms supported by a node;
receiving a first response message comprising information pertaining to an authentication mechanism determined by the wireless network to be used for bootstrapping based at least on the list of authentication mechanisms received from the node;
sending a second message to the wireless network that is at least partially integrity protected based on the authentication mechanism, the second message comprising the list of authentication mechanisms that the node supports in an integrity protected form, and
when authentication is successful, and if the list sent in the second message matches the list sent in the first message, receiving a second response message that is at least partially integrity protected, where the second response message comprises an indication of the selected authentication mechanism in an integrity protected form.

40. The method as in claim 39, where first message further comprises an identification of a user of the node.

41. The method as in claim 39, where the first message is sent as an HTTP GET that comprises an identification of a user of the node, where the list is included in an HTTP payload.

42. The method as in claim 39, where the first response message is received as an HTTP 401 unauthorized response.

43. The method as in claim 39, where the second message is sent as an HTTP GET that comprises a computed response in accordance with the selected authentication mechanism.

44. The method as in claim 39, where the second response message is received as an HTTP 200 OK message.

45. The method as in claim 39, further comprising verifying that the authentication mechanism used by the node matches the authentication mechanism determined by the wireless network.

* * * * *